US005394045A

United States Patent [19]

Takehara

[11] Patent Number: 5,394,045

[45] Date of Patent: Feb. 28, 1995

[54] BRUSHLESS MOTOR

[75] Inventor: Isamu Takehara, Tokyo, Japan

[73] Assignee: Seiko Instruments Inc., Japan

[21] Appl. No.: 95,955

[22] Filed: Jul. 22, 1993

[30] Foreign Application Priority Data

Aug. 5, 1992 [JP] Japan .................................. 4-209009

[51] Int. Cl.[6] ................................................ H02K 3/00

[52] U.S. Cl. .................................... 310/184; 310/156; 310/198; 310/207

[58] Field of Search ............... 310/156, 207, 179, 180, 310/184, 198, 203, 204, 208

[56] References Cited

U.S. PATENT DOCUMENTS 4,403,160 9/1983 Hibino ................................ 310/184
4,692,645 9/1987 Gotou ................................. 310/184
4,774,428 9/1988 Konecny ............................. 310/198
5,051,640 9/1991 Freise ................................. 310/179

*Primary Examiner*—R. Skudy
*Attorney, Agent, or Firm*—Bruce L. Adams; Van C. Wilks

[57] ABSTRACT

A brushless motor has a rotor magnet integrated with an output shaft. The armature coil unit is comprised of an integral number of coil blocks superposed with one another. Respective coil blocks have a displacement angle of $X_M=360\times M/n$ degrees relative to a reference coil block, wherein $X_M$ denotes the displacement angle of the Mth coil block relative to the reference block, M denotes a positive integer from 1 to $n-1$ (the Mth coil block relative to the reference block), and n represents the number of coil blocks and is an even integer having a value of 4 or more. Each coil block shares a center angle of $X_2+360/P$ degrees, wherein $X_2$ denotes the displacement angle of the second coil block relative to the reference block, and P denotes the number of poles of the permanent magnet. The coil blocks are connected in series to form respective phases of the armature coil blocks such that the armature coil blocks of each phase pass an electric current in the same direction. By this construction, the brushless motor has an even number of coil blocks superposed with one another at a predetermined displacement angle and, as a result, the brushless motor can produce a higher output torque through a series connection of coils and has a reduced number of junction nodes as compared to a motor utilizing a parallel connection.

12 Claims, 12 Drawing Sheets

420°
240°
120° 120°
180° 60° 180°
51
240°
36a A1 36c P 31a A2 31c
X1 = 120°
120°
52
32a B1 32c β 33a B2 33c
X2=240°
53
34a C1 34c γ 35a C2 35c

F I G. 2
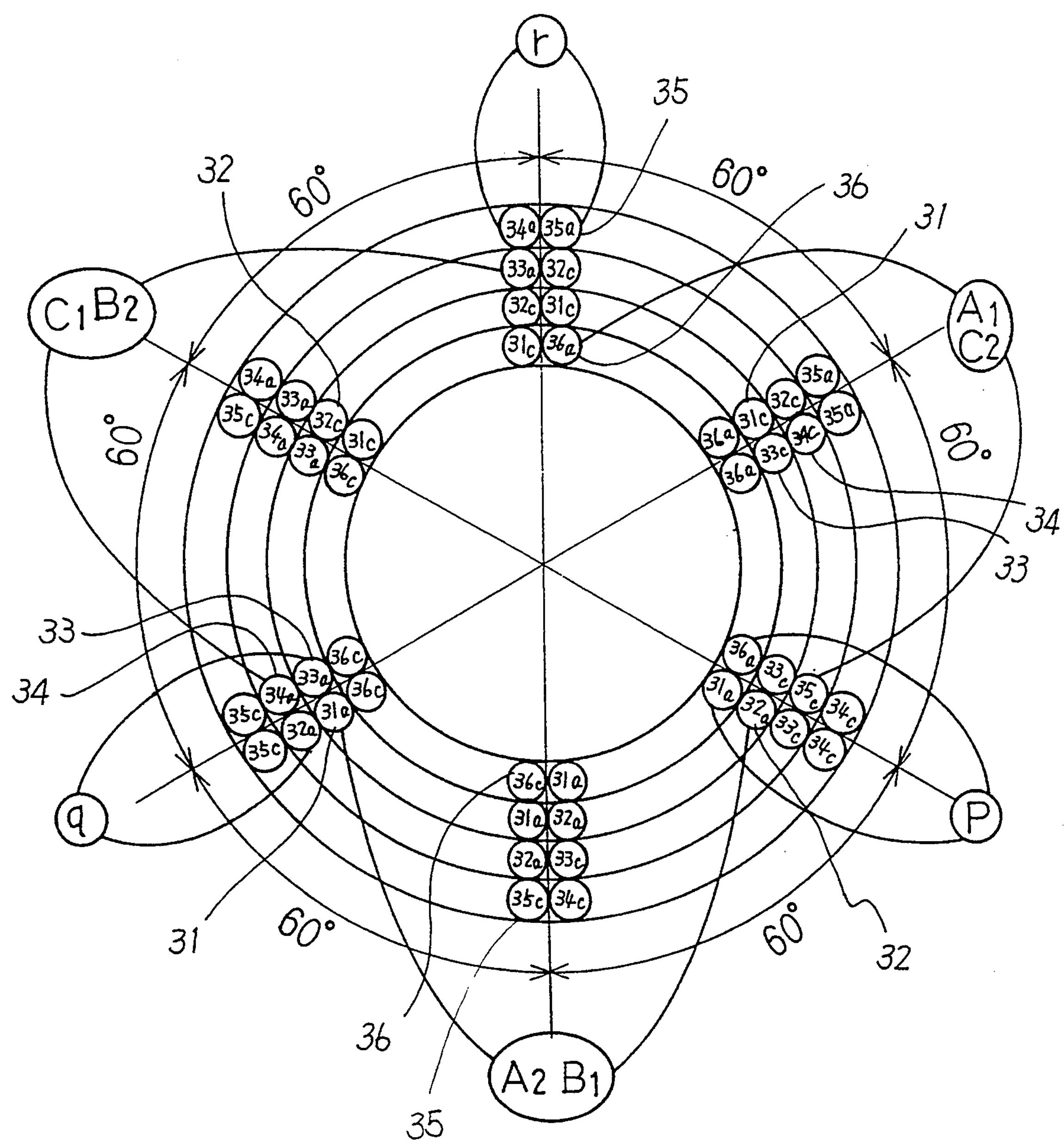

F I G. 7
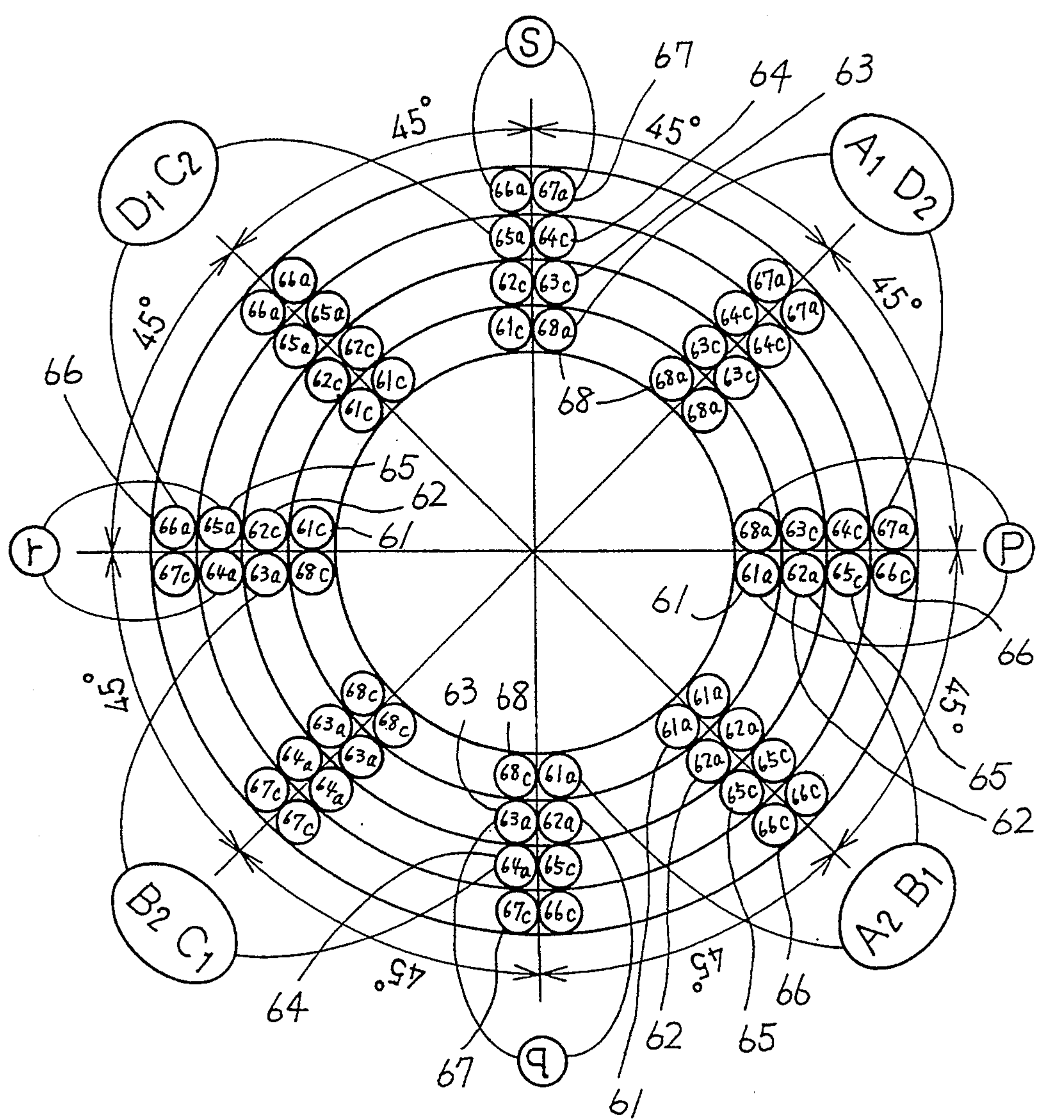

BRUSHLESS MOTOR

BACKGROUND OF THE INVENTION

The present invention relates to a brushless motor having an armature coil unit fixed to a casing, and a rotor magnet formed with an even number of poles and integrated with an output shaft for rotatably supporting the rotor magnet.

There has been known the conventional brushless motor of the spindle type used in office automation equipment, automatic machinery, medical instruments and so FIG. 12 is a structural diagram of a prior art brushless motor. In manner similar to other types of motors, there are included a rotor magnet 3 and a stator composed of an armature coil unit 5. The rotor magnet 3 solely contributes to generation of output torque. The motor further has an output shaft 6 for rotatably supporting the rotor magnet 3. On the other hand, the stator is constructed such that the armature 4 composed of an armature coil unit 5 is fixed to an inner wall of a cylindrical casing 1 fixed to the bearing housing 2, while the casing 1 functions as a return yoke of the rotor magnet 3 and the armature coil unit 5. An electric current is fed to the armature coil unit 5 via lead wires 8. A pair of washers 9 are disposed on outer faces of the respective bearings 2 in order to suppress axial movement of the rotor magnet 3 during the course of rotation thereof. Further, the motor has not a sensor portion.

The conventional brushless motor has a winding structure shown in FIGS. 13, 14 and 15 wherein the armature coil unit 5 has a plurality of coils terminating in terminals or taps p, q, r and s. When the coils of the armature coil unit 5 are laid out as shown in FIGS. 14–15, they have a diameter dimension La. The armature coil unit 5 of the brushless motor is connected electrically as shown in FIG. 16 to form the armature 4 as shown in FIG. 18. As understood from FIG. 18, this winding is formed such that the armature coil unit 5 of the armature 4 has a radial thickness defined by two layers of the windings. However, since the radial thickness is limited to twice much as a diameter of the coil wire, the conventional structure has the drawback that the coil wires cannot be wound thick freely thereby limiting the amount of copper in the coil unit.

Particularly in reducing the motor size, while an energy product of the magnet has been improved efficiently, a magnetic motive force of the coil of the armature has not been improved efficiently. Stated otherwise, in reducing the motor size, the magnetic loading has been improved while the electric loading has not been improved. The motor output torque cannot be optimally improved unless a design balance is ensured with respect to a ratio between the magnetic loading and the electric loading. In view of this, it is necessary to broaden optimally a space gap between the magnet and the casing so as to increase the amount of the copper in armature coil unit. In order to increase the amount of copper in the coil, it is necessary to increase the radial thickness of the cylindrical coil unit.

It might be advisable to form multiple stages of the cylindrical coil units. However, for example, in the case that respective stages of the coil units are connected in parallel with each other as shown in FIG. 17, there may be caused the drawback that an inductive voltage coefficient Ke cannot be raised adequately in the multiple-stage motor. There is a problem that the series connection is needed in order to increase the value of Ke in the prior art.

SUMMARY OF THE INVENTION

Accordingly, in order to solve the afore-mentioned problem of the prior art, an object of the invention is to provide a brushless motor having a series connection structure featuring a high output torque. According to the invention, in the brushless motor having coil blocks of an armature coil unit and integrated with a casing, and a rotor magnet formed with even number of poles and integrated with an output shaft for rotatably supporting the rotor magnet, the armature coil unit is comprised of n number of coil blocks superposed with one another such that each coil block has a pair of side-edge portions sharing a center angle or an angular interval of $(X_2+360/P)$ degrees so that respective ones of the coil blocks have a shift angle $X_M=360\times M/n$ degress relative to a reference one of the coil blocks, where M denotes a positive integer of "1" to "n−1", n denotes "3" or a larger positive integer, and P denotes a number of poles of the permanent magnet.

In the brushless motor constructed as described above, when a given voltage is applied to an input terminal of the armature coil unit by a predetermined sequence, an electric current flows through each phase of the coil blocks of the armature coil unit in the same direction. Consequently, the output shaft of the brushless motor rotates due to a magnetic force generated in a space gap between the rotor magnet and the armature coil unit.

BRIEF DESCRIPTION OF THE DRAWINGS

FIG. 2 is a connection wiring diagram of the first embodiment of the brushless motor according to the present invention.

FIG. 7 is a connection wiring diagram of the second embodiment of the brushless motor according to the present invention.

DETAILED DESCRIPTION OF THE INVENTION

Figure 1:
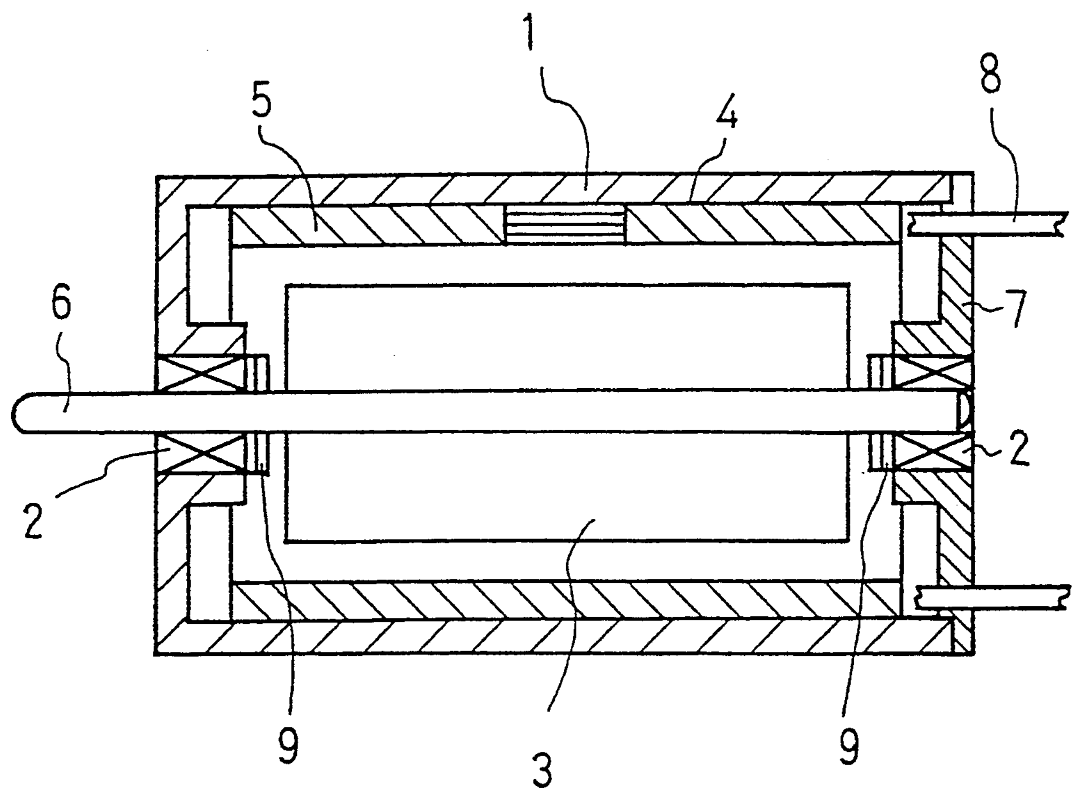
FIG. 1 is a structural diagram of the inventive brushless motor.

Hereinafter, embodiments of the present invention will be described in conjunction with the drawings. Referring to FIG. 1, the inventive brushless motor has a rotor magnet 3, a bearing housing 2, and a casing 1, constructed similarly as the conventional brushless motor. Further, there are provided an .armature coil unit 5, and an output shaft 6.

Figure 3:
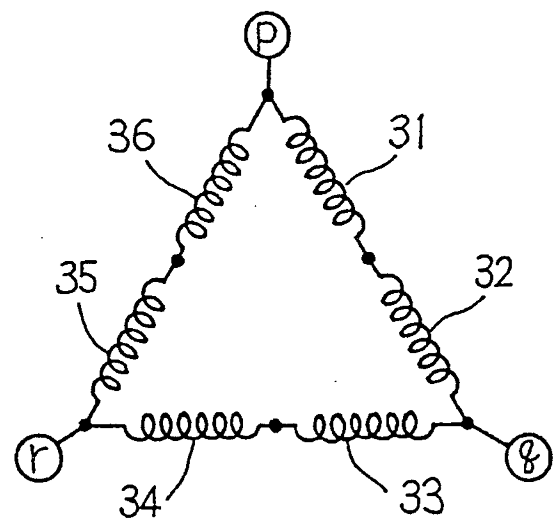
FIG. 3 is a basic connection wiring diagram of the first embodiment of the brushless motor according to the present invention.

The inventive brushless motor is different from the conventional brushless motor substantially in the winding and connecting structure of the armature coil unit 5. The first embodiment of the armature coil unit is shown in FIGS. 2–6 according to the invention. FIG. 3 is a basic circuit diagram showing a delta connection of the first embodiment according to the invention. A pair of coils 31 and 32 are connected in series to each other between terminals or taps p and q. Another pair of coils 33 and 34 are connected between terminals or taps q and r. A further pair of coils 35 and 36 are connected between terminals or taps r and p. The coils 31–36 are arranged to constitude the armature coil unit 5 of FIG. 1.

Figure 4:
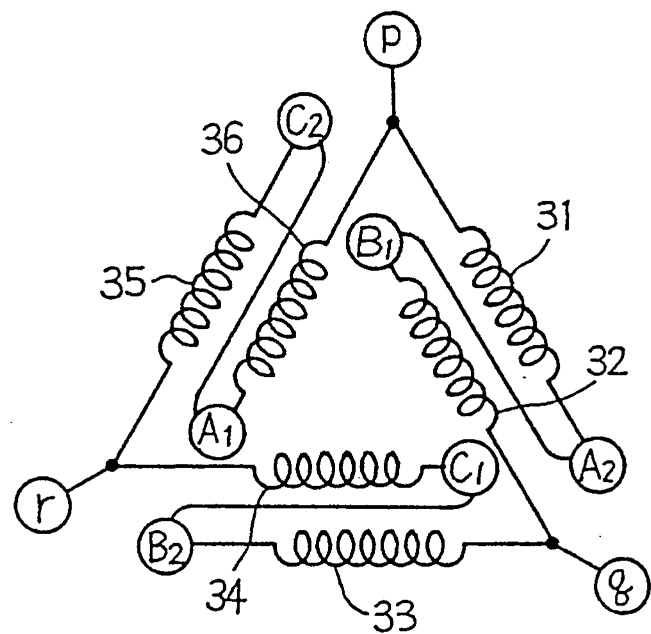
FIG. 4 is a schematic diagram of an armature coil unit in the first embodiment of the brushless motor according to the present invention.

FIG. 4 is a basic coil arrangement diagram of the first embodiment of the armature coil unit 5 according to the invention. The coils 31 and 32 are overlapped with one another between the terminals p and q through intermediate nodes $A_2$ and $B_1$. The coils 33 and 34 are overlapped with one another between the terminals q and r through intermediate nodes $B_2$ and $C_1$. The coils 35 and 36 are overlapped with one another between the terminals r and p through intermediate nodes $C_2$ and $A_1$. In this configuration, the nodes $B_1$ and $C_2$ are arranged adjacently to the terminal or tap p, the nodes $A_2$ and $C_1$ are disposed adjacently to the terminal q, and the nodes $B_2$ and $A_1$ are positioned adjacently to the terminal r.

Next, a description is given for the operation of the first embodiment of the invention. Referring to FIG. 4, the terminal p is applied with a positive potential and the other terminal q is applied with a negative potential at a given moment, while the remaining terminal r is turned off. An electric current flows through the coils 31 and 32 such that respective electric current components of coils 31 and 32 flow in the same direction. Consequently, the coils 31 and 32 can generate a magnetic field in the same direction. In similar manner, the pair of coils 33 and 34, and the other pair of coils 35 and 36 may generate a magnetic field in the same direction, respectively. The output shaft 6 of the brushless motor rotates due to interaction between the magnetic fields of the coils 31–36 and the magnetic field of the rotor magnet 3.

At a next step, the terminal r is applied with a positive potential and the other terminal q is applied with a negative potential, while the remaining terminal p is turned off. An electric current flows through the coils 33 and the coil 34 in the same direction. In similar manner, the pair of coils 35 and 36, and the other pair of coils 31 and 32 can generate a magnetic field in the same direction, respectively. The output shaft 6 of the brushless motor rotates according to the magnetic fields of the coils 31–36 and the magnetic field of the rotor magnet 3. Thereafter in similar manner, the polarity of the voltages applied to the respective terminals is switched sequentially to continue the rotation of the output shaft 6 of the brushless motor.

Figure 5:
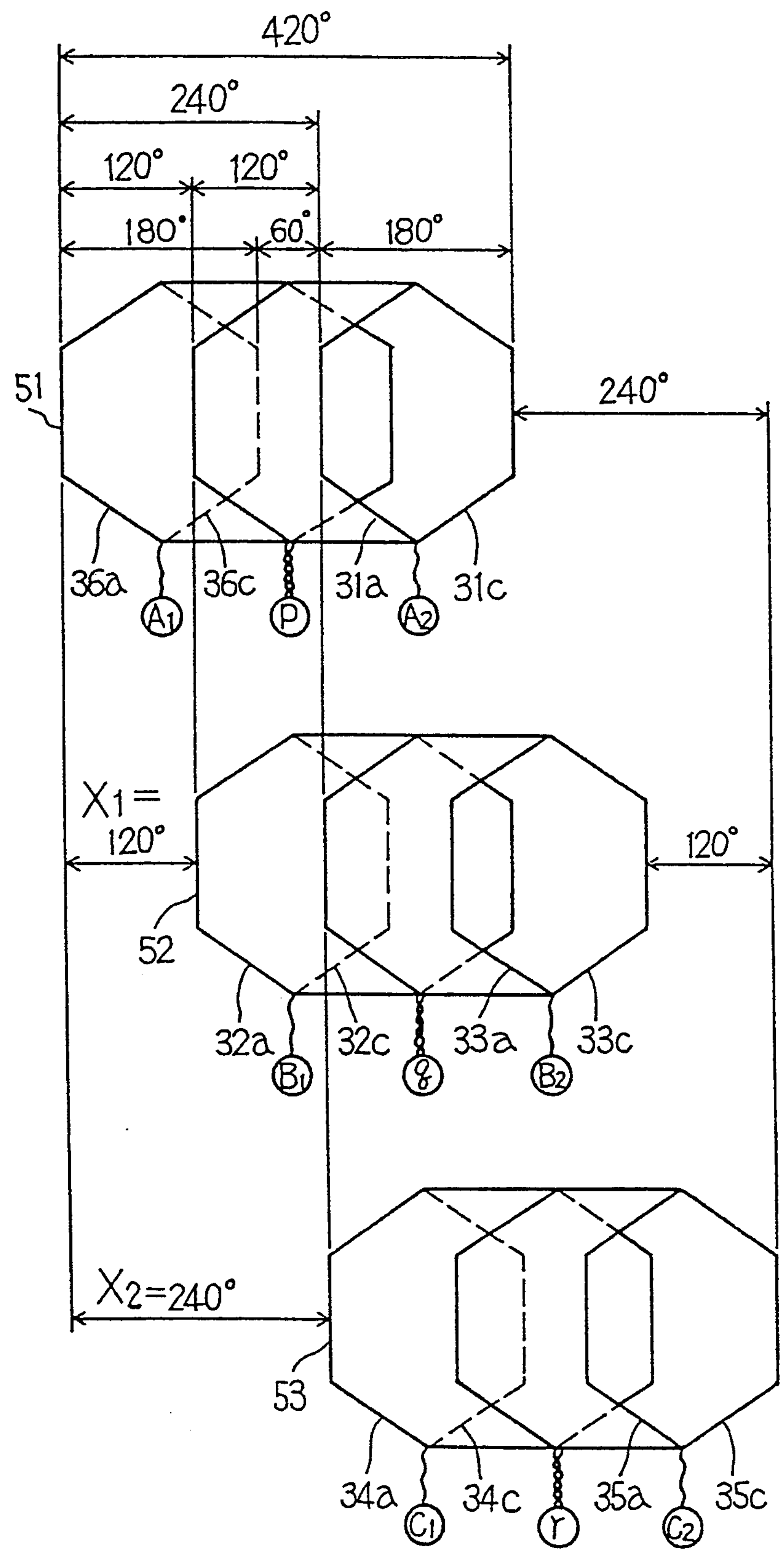
FIG. 5 is a coil arrangement diagram of the first embodiment of the brushless motor according to the present invention.

FIG. 5 is a coil block arrangement diagram of the first embodiment according to the invention. A coil block 51 is formed of hexagonal coils which are wound from a start node $A_1$. The coils are wound spirally and sequentially in the rightward direction when the figure is viewed from the front side. A front coil **36*a* and a rear coil 36*c* are disposed in opposed relation and are arranged from the winding start node $A_1$ to the intermediate tap p. Next, a front coil 31*a* and a rear coil 31*c*** are disposed in opposed relation and are arranged from the intermediate tap p to the winding end node $A_2$. A coil pitch of the hexagonal configuration, i.e., a pitch interval from the winding start node $A_1$ to the intermediate tap p is set to 120 degrees in terms of a mechanical angle which is defined as an angular pitch between side lines of adjacent hexagonal configurations.

Further, similarly a pitch interval is set to 120 degrees in terms of the mechanical angle between the intermediate tap p and the winding end node $A_2$. A closed circuit composed of a single loop of the coil wound spirally has a coil pitch interval which is set substantially identical to a magnetic pole pitch interval of the rotor magnet 3 (which has two poles in this embodiment). Namely, the coil pitch interval is set to 180 degrees in this embodiment. The mechanical angle of the coil block 51 is set to 180 degrees between the leading side line of the front coil **36*a* and the side line of the rear coil 36*c*. Although, this value of 180 degrees is a whole node pitch on the design configuration, the mechanical angle may be set more than or less than 180 degree according to a design choice. The coil block 51** has the entire pitch interval of 420 degrees in terms of the mechanical angle.

In manner similar to the first coil block 51, the coil block 52 includes a front or top coil **32*a* and a rear or back coil 32*c* disposed in opposite faces between the winding start node $B_1$ and the intermediate tap q. Further, a front coil 33*a* and a rear coil 33*c* are disposed in superposed relation between the intermediate tap q and the windng end node $B_2$. The coil block 52 has a certain mechanical angle, between side lines thereof, set similarly as the coil block 51. The coil block 52 is shifted or displaced from the coil block 51 by 120 degrees in terms of the mechanical angle. In a manner similar to the first and second coil blocks 51, 52 the third coil block 53 has a front coil 34*a* and a rear coil 34*c* which are overlapped with each other between the winding start node $C_1$ and the intermediate tap r. Further, a front coil 35*a* and a rear coil 35*c* are dipposed in opposite faces between the intermediate tap r and the winding end node $C_2$. The coil block 53 has certain mechanical angle, between separate side lines, set similarly as those of the first and second coil blocks. 51, 52. The coil block 53 is displaced from the first coil block 51** by 240 degrees in terms of the mechanical angle.

Figure 6:
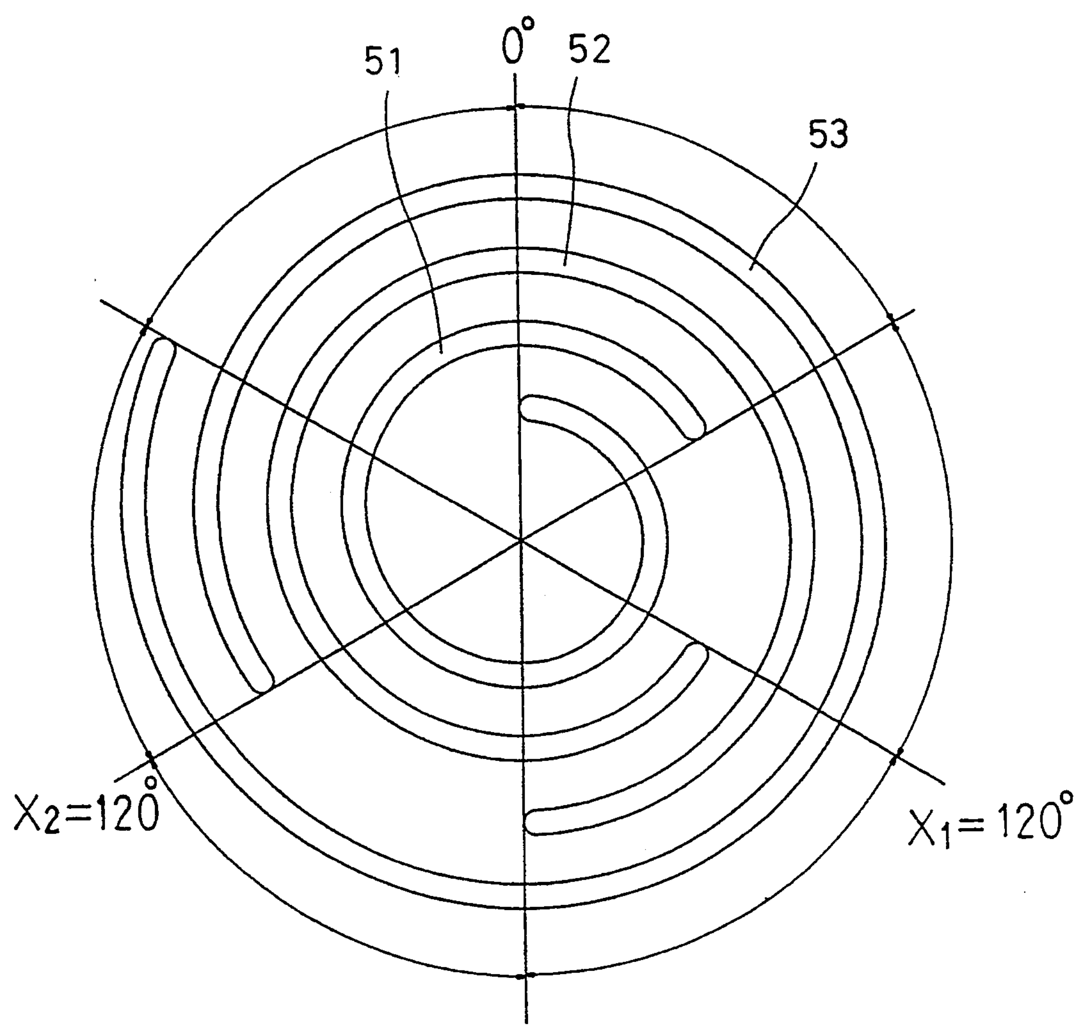
FIG. 6 is a diagram showing a laminate structure of one coil block in the embodiment of the brushless motor according to the invention, observed from a motor output shaft.

FIG. 6 is a schematic sectional view of the overlapping structure of the coil blocks 51, 52 and 53, observed from an axial direction of the motor output shaft. The winding start portion and the winding end portion of each coil block overlap with one another by 60 degrees, because each block has an entire pitch interval of 420 degrees in terms of the mechanical angle.

FIG. 2 is a schematic lead pattern diagram showing an electrical connection among the front and rear coils 31*a*, 31*c* through 36*a*, 36*c* of the coils 31–36, the junction node or pad patterns $A_1/C_2$, $B_1/A_2$ and $C_1/B_2$ and the terminals or taps p, q and r. In the present embodiment, the coils 31–36 are superposed with one another in four layers throughout the entire length of a circle.

Figure 8:
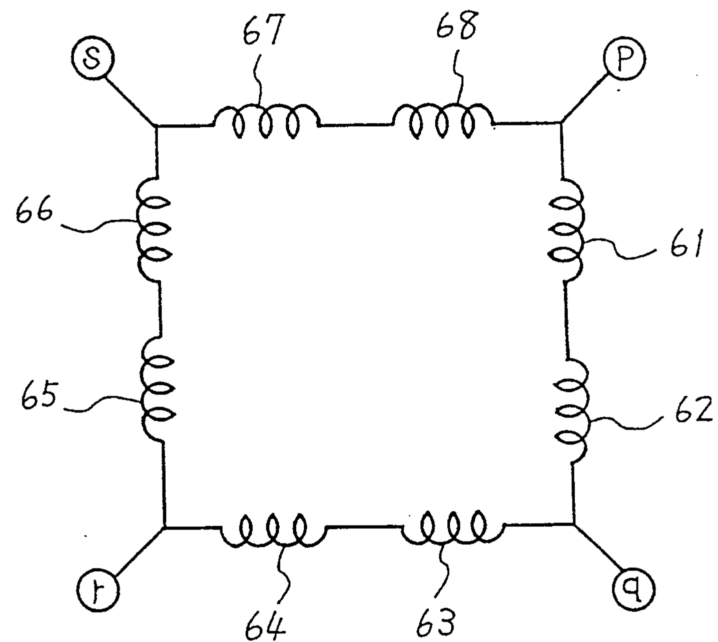
FIG. 8 is a basic connection wiring diagram of the second embodiment of the inventive brushless motor.

FIG. 8 is a basic circuit diagram showing a ring connection of the second embodiment according to the invention. A pair of coils 61 and 62 are connected in series with each other between terminals or taps p and q. Another pair of coils 63 and 64 are connected between terminals or taps q and r. A further pair of coils 65 and 66 are connected between terminals or taps r and s. Furthermore, a pair of coils 67 and 68 are connected between terminals or taps s and p. The coils 61–68 are arranged to constitute the armature coil unit 5 of FIG. 1.

Figure 9:
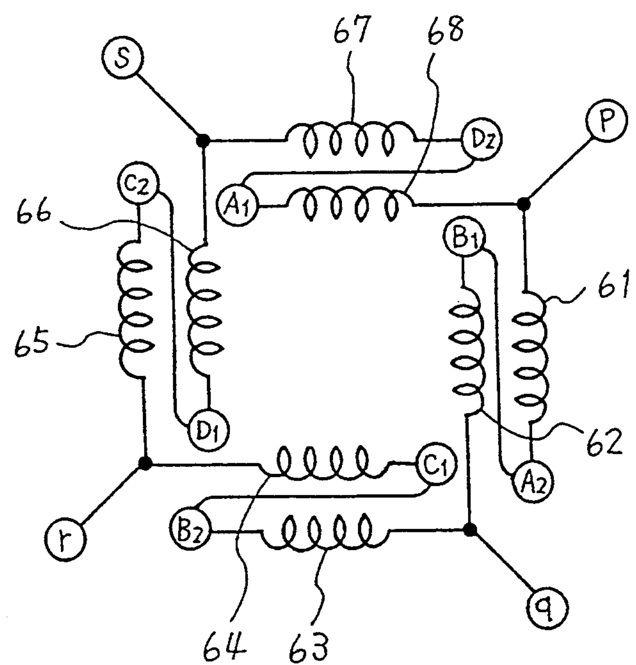
FIG. 9 is a schematic diagram of an armature coil unit in the second embodiment of the inventive brushless motor.

FIG. 9 is a basic coil arrangement diagram of the second embodiment of the armature coil unit 5 according to the invention. The coils 61 and 62 are overlapped with one another between the terminals p and q through intermediate nodes $A_2$ and $B_1$. The coils 63 and 64 are overlapped with one another between the terminals q and r through intermediate nodes $B_2$ and $C_1$. The coils 65 and 66 are overlapped with one another between the terminals r and s through intermediate nodes $C_2$ and $D_1$. The coils 67 and 68 are overlapped with one another between the terminals s and p through intermediate nodes $D_2$ and $A_1$. In this configuration, the nodes $B_1$ and $D_2$ are arranged adjacently to the terminal or tap p, the nodes $A_2$ and $C_1$ are disposed adjacently to the terminal q, the nodes $B_2$ and $D_1$ are positioned adjacently to the terminal r, and the nodes $C_2$ and $A_1$ are disposed adjacently to the terminal s.

Next, a description is given for the operation of the second embodiment of the invention. Referring to FIG. 9, the terminal p is applied with a positive potential and the other terminal r is applied with a negative potential at a given moment, while the remaining terminals q and s are turned off. An electric current flows through the coils 61 and 62 such that respective electric current components of coils 61 and 62 flow in the same direction. Consequently, the coils 61 and 62 can generate a magnetic field in the same direction. In similar manner, the pair of coils 63 and 64, the pair of coils 65 and 66, and the pair of coils 67 and 68 may generate a magnetic field in the same direction, respectively. The output shaft 6 of the brushless motor rotates due to interaction between the magnetic fields of the coils 61–68 and the magnetic field of the rotor magnet 3.

At a next step, the terminal q is applied with a positive potential and the other terminal s is applied with a negative potential, while the remaining terminals p and r are turned off. An electric current flows through the coils 63 and the coil 64 in the same direction. In similar manner, the pair of coils 65 and 66, the pair of coils 67 and 68, and the pair of coils 61 and 62 can generate a magnetic field in the same direction, respectively. The output shaft 6 of the brushless motor rotates according to the magnetic fields of the coils 61–68 and the magnetic field of the rotor magnet 3. Thereafter in similar manner, the polarity of voltages applied to the respective terminals is switched sequentially to continue the rotation of the output shaft 6 of the brushless motor.

Figure 10:
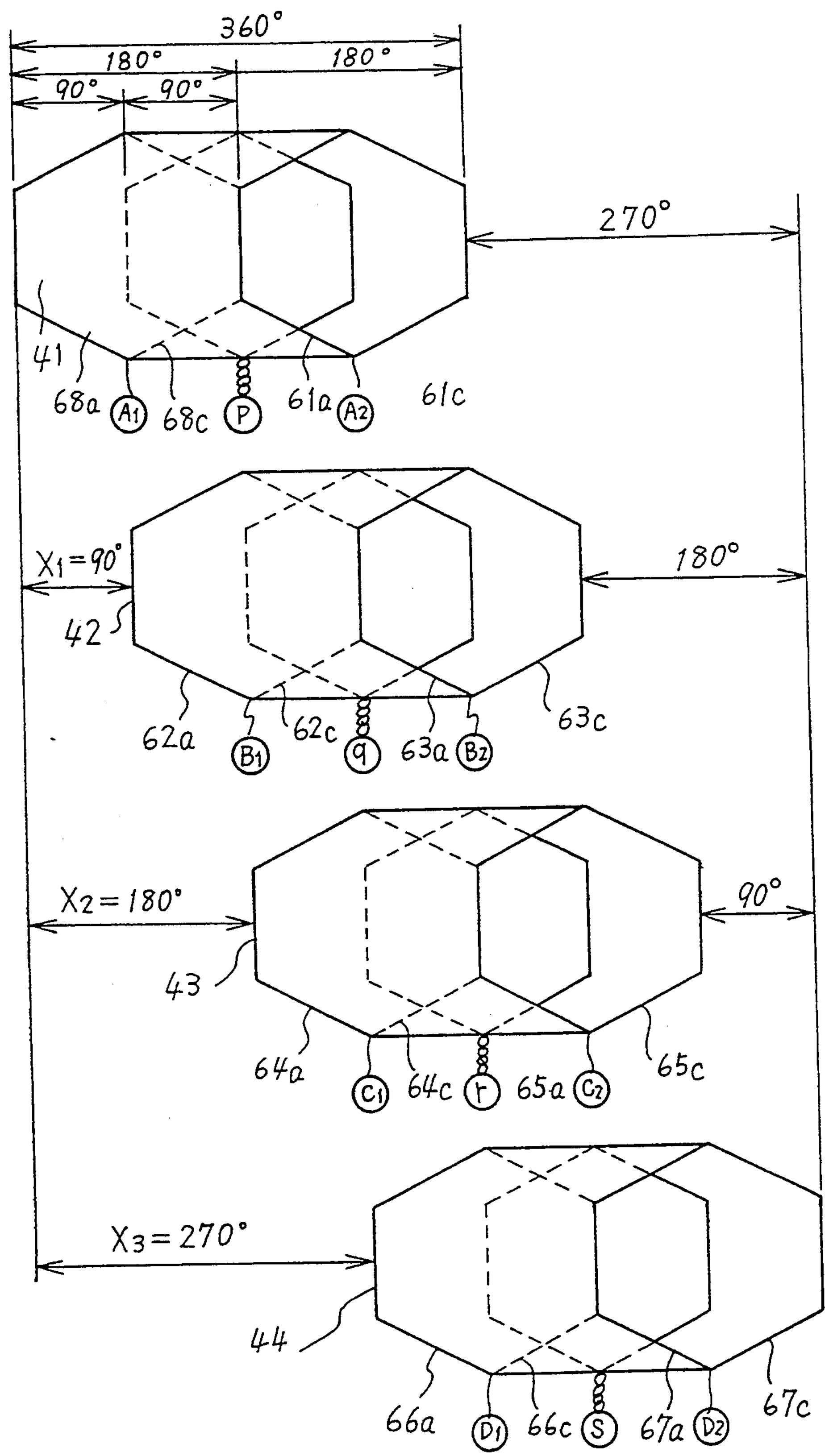
FIG. 10 is a coil arrangement diagram of the second embodiment of the brushless motor according to the present invention.

FIG. 10 is a coil block arrangement diagram of the second embodiment according to the invention. A coil block 41 is formed of hexagonal coils which are wound from a start node $A_1$. The coils are wound spirally and sequentially in the rightward direction when the figure is viewed from the front side. A front coil 68*a* and a rear coil 68*c* are disposed in opposed relation and are arranged from the winding start node $A_1$ to the intermediate tap p. Next, a front coil 61*a* and a rear coil 61*c* are disposed in opposed relation and are arranged from the intermediate tap p to the winding end node $A_2$. A coil pitch of the hexagonal configuration, i.e., a pitch interval from the winding start node $A_1$ to the intermediate tap p is set to 90 degrees terms of a mechanical angle which is defined as an angular pitch between side lines of adjacent hexagonal configurations.

Further, similarly a pitch interval is set to 90 degrees in terms of the mechanical angle between the intermediate tap p and the winding end point $A_2$. A closed circuit composed of a single loop of the coil wound spirally has a coil pitch interval which is set substantially identical to a magnetic pole pitch interval of the rotor magnet 3 (which has two poles in this embodiment). Namely, the coil pitch interval is set to 180 degrees in this embodiment. The mechanical angle of the coil block 41 is set to 180 degrees between the leading side line of the front coil 68*a* and the side line of the rear coil 68*c*. Although the value of 180 degrees is a whole node pitch in design configuration, the mechanical angle may be set to more than or less than 180 degrees according to a design choice. Further the front coil 61*a* and a rear coil 61*c* are disposed in superposed relation between the intermediate tap p and the winding end node $A_2$. The coil block 41 has the entire pitch interval of 360 degrees in terms of the mechanical angle.

In manner similar to the first coil block 41, the coil block 42 includes a front or top coil 62*a* and a rear or back coil 62*c* disposed in opposite faces between the winding start node $B_1$ and the intermediate tap q. Further, a front coil 63*a* and a rear coil 63*c* are disposed in superposed relation between the intermediate tap q and the winding end node $B_2$. The coil block 42 has a certain mechanical angle, between side lines thereof, set similarly as that of the coil block 41. The coil block 42 is shifted or displaced from the coil block 41 by 90 degrees in terms of the mechanical angle. In manner similar to the first and second coil blocks 41, 42, the third coil block 43 has a front coil 64*a* end a rear coil 64*c* which are overlapped with each other between the winding start node $C_1$ and the intermediate tap r. Further, a front coil 65*a* and a rear coil 65*c* are dipposed in opposite faces between the intermediate tap r and the winding end node $C_2$. The coil block 43 has a certain mechanical angle, between separate side lines, set similarly as the first coil block 41. The coil block 43 is displaced from the first coil block 41 by 180 degrees in terms of the mechanical angle. The coil block 44 has a certain mechanical angle between separate side lines, set similarly as the first coil block 41. The coil block 44 is displaced from the first coil block 41 by 270 degrees in terms of the mechanical angle.

Figure 11:
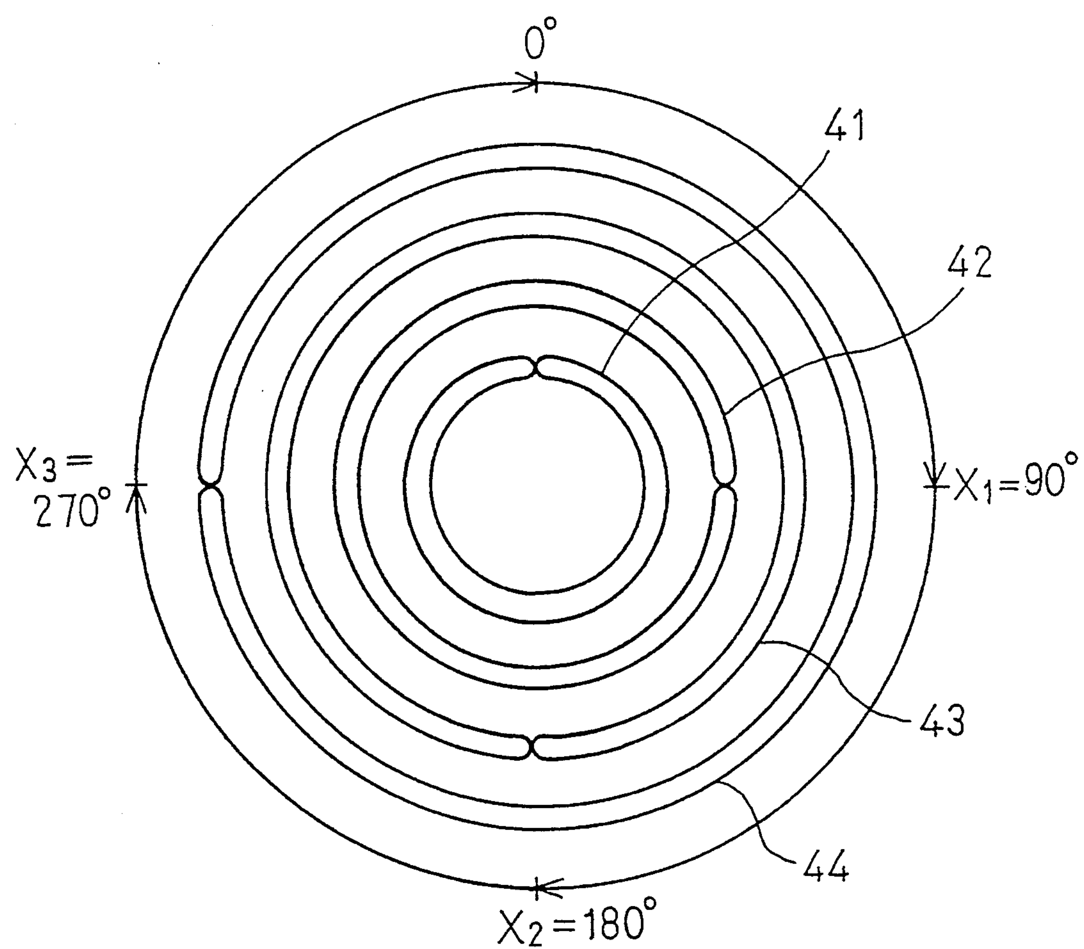
FIG. 11 is a diagram showing a laminate structure of the coil block in the second embodiment of the brushless motor according to the present invention, observed from a motor output shaft.
Figure 12:
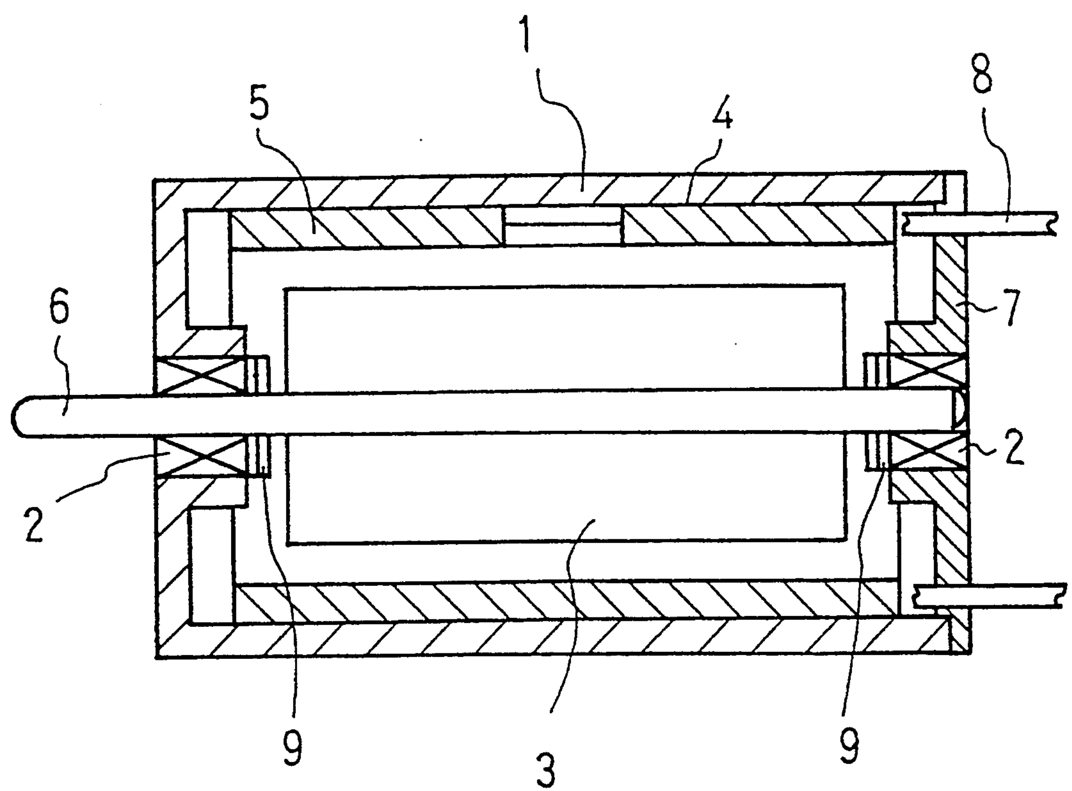
FIG. 12 is a structural diagram of the conventional brushless motor.
Figure 13:
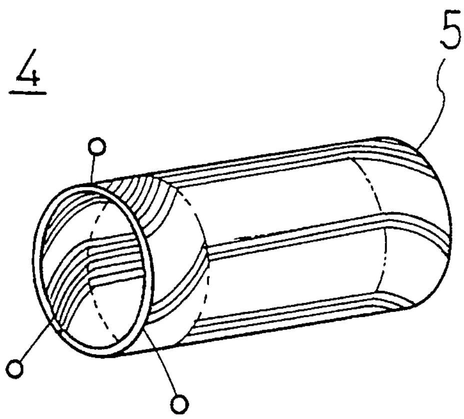
FIG. 13 is a perspective view of an armature coil unit in the conventional brushless motor.
Figure 14:
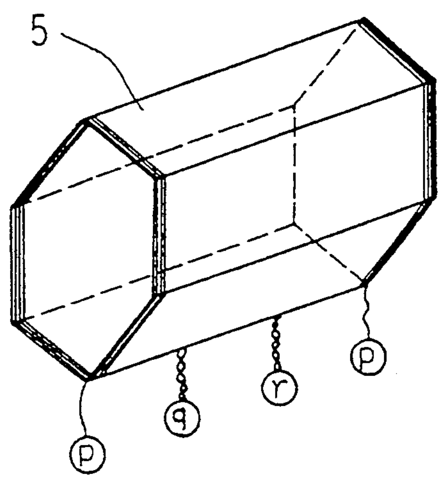
FIG. 14 is a perspective view of coil windings in the conventional brushless motor in the flat form.
Figure 15:
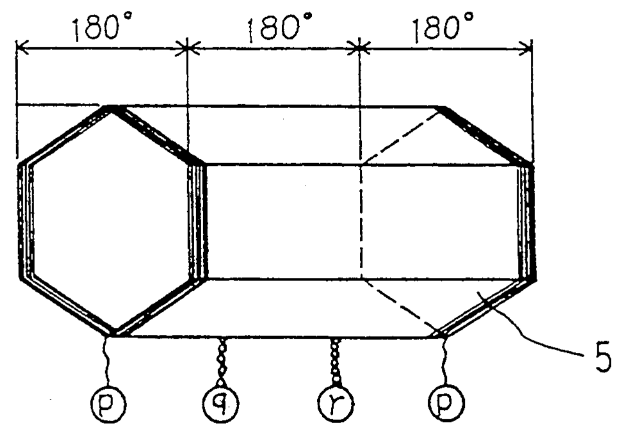
FIG. 15 is a plan view of coil windings of the conventional brushless motor in the flat form.
Figure 16:
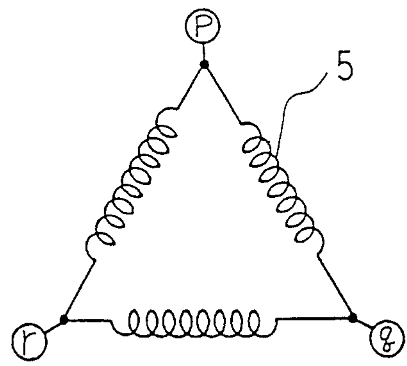
FIG. 16 is a schematic connection wiring diagram of a coil in the conventional brushless motor.
Figure 17:
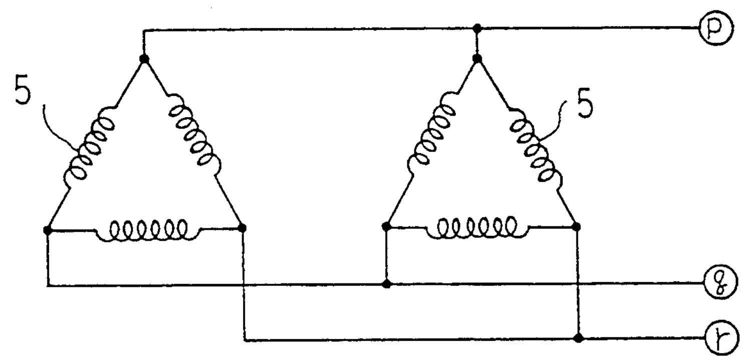
FIG. 17 is a schematic parallel connection wiring diagram of a coil in the conventional brushless motor.
Figure 18:
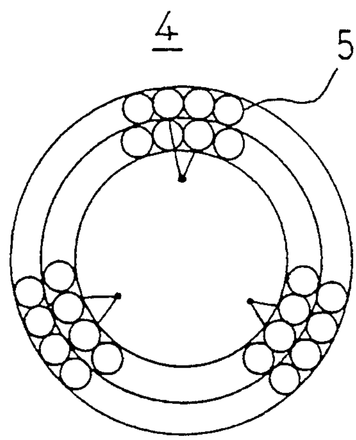
FIG. 18 is a diagram showing a coil of the conventional brushless motor, viewed from a motor output shaft.

FIG. 11 is a schematic sectional view of the overlapping structure of the coil blocks 41, 42, 43 and 44 observed from an axial direction of the motor output shaft.

The winding start portion and the winding end portion of each coil block overlap with one another by 90 degrees, because each block has an entire pitch interval of 360 degrees in terms of the mechanical angle.

FIG. 7 is a schematic lead pattern diagram showing an electrical connection among the coils 61–68, the junction node or pad patterns $A_1/D_2$, $B_1/A_2$, $C_1/B_2$ and $D_1/C_2$ and the terminals or taps p, q, r and s of the commutator segments. In the present embodiment, the coils 61–68 are superposed with one another in four layers throughout the entire length of a circle.

As described above, the inventive brushless motor has n number of coil blocks. The M-th coil block has a shift angle $X_M$ as follows:

In case of the first embodiment shown in FIG. 5 and FIG. 6, the phase number is set to n=3.

$$X_1=360/n=120°$$

$$X_2=360\times2/n=240°$$

In case of the second embodiment shown in FIG. 10 and FIG. 11, the phase number is set to n=4, $$X_1=360/n=90°$$

$$X_2=360\times2/n=180°$$

$$X_3=360\times3/n=270°$$

Accordingly, the shift angle $X_M$ of the M-th coil block is represented generally by $X_M=360\times M/n$ degrees, where M denotes a positive integer of a positive integer "1"-"n−1", n denotes "3" or more a positive integer. Further, each coil shares a center angle or an angular interval of $(X_2+360/p)$ degrees, where P denotes a pole number of the rotor magnet.

Furthermore, the present invention can be used not only in an inner rotor type brushless mortor described above but also in an outer rotor type brushless motor.

As described above, according to the invention, the brushless motor has a plurality of coil blocks superposed with one another at a predetermined shift angles, thereby achieving the following effects:

(1) The brushless motor can produce a high output torque through a series connection of coils.

(2) There can be a reduced number of junction nodes as compared to the parallel connection.

What is claimed is:

1. A brushless motor comprising:

an armature coil unit comprising a plurality of coil blocks integrated with a casing; and a rotor magnet integrated with an output shaft for rotatably supporting the rotor magnet and having an even number of poles;

wherein the armature coil unit comprises n number coil blocks superposed with one another, each coil block sharing a center angle of $X_2+360/P$ degrees, respective coil blocks having displacement angles of $X_M=360\times M/n$ degrees relative to a reference one of the coil blocks where M denotes a positive integer having a value within the range "1" to "n−1", n denotes a positive integer having a value of "3" or more, $X_2$ denotes a value of $X_M$ when M=2 and P denotes a number of poles of the rotor magnet, and wherein the coil blocks are connected in series so as to form respective phases of the coil blocks such that the coil blocks of each phase can pass an electric current in a same direction.

2. A brushless motor according to claim 1; wherein the rotor magnet has two poles.

3. A brushless motor according to claim 1; wherein the n number of coil blocks are superposed in n number of layers each of circular configuration and laminated together to form the armature coil unit.

4. A brushless motor comprising: a rotor magnet having an output shaft and mounted to undergo rotation relative to an armature coil unit, and an armature coil unit comprising a plurality of coil blocks superposed with one another such that respective ones of the coil blocks have a shift angle relative to a reference one of the coil blocks of $X_M=360\times M/n$ degrees and such that each coil block shares a center angle of $X_2+360/P$ degrees, wherein $X_M$ is a value in degrees and denotes a shift angle relative to the reference coil block, n is an even integer value of 3 or more and denotes the number of coil blocks, M is a positive integer between 1 and n−1 and denotes an Mth coil block relative to the reference coil block, and P denotes the number of poles of the rotor magnet.

5. A brushless motor according to claim 4; including means electrically connecting coils of the coil blocks in series.

6. A brushless motor according to claim 5; wherein the coil blocks are arranged so that electric current flows in the same direction through the coils of all the coil blocks to produce magnetic fields in the same direction which coact with a magnetic field produced by the rotor magnet to effect rotation of the output shaft.

7. A brushless motor according to claim 4; wherein the coil blocks are arranged so that electric current flows in the same direction through the coils of all the coil blocks to product magnetic fields in the same direction which coact with a magnetic field produced by the rotor magnet to effect rotation of the output shaft.

8. A brushless motor according to claim 4; wherein the number of coil blocks n is 3, such that a second one of the coil blocks relative to the reference coil block has a shift angle relative to the reference block of $X_2=360\times2/3=240$ degrees.

9. A brushless motor according to claim 4; wherein the number of coil blocks n is 4, such that a second one of the coil blocks relative to the reference coil block has a shift angle relative to the reference coil block of $X_2=360\times2/4=180$ degrees.

10. A brushless motor according to claim 8; wherein the number of poles is 2, such that each coil block shares a center angle of $240+360/2=420$ degrees.

11. A brushless motor according to claim 9; wherein the number of poles is 2, such that each coil block shares a center angle of $180+360/2=360$ degrees.

12. A brushless motor according to claim 4; wherein the n number of coil blocks are superposed in n number of layers each of circular configuration and laminated together to form the armature coil unit.

* * * * *